Aug. 22, 1939.  F H. LE JEUNE  2,170,661
METHOD OF MANUFACTURING WHEEL BODY ELEMENTS
Filed Feb. 23, 1937  3 Sheets-Sheet 1
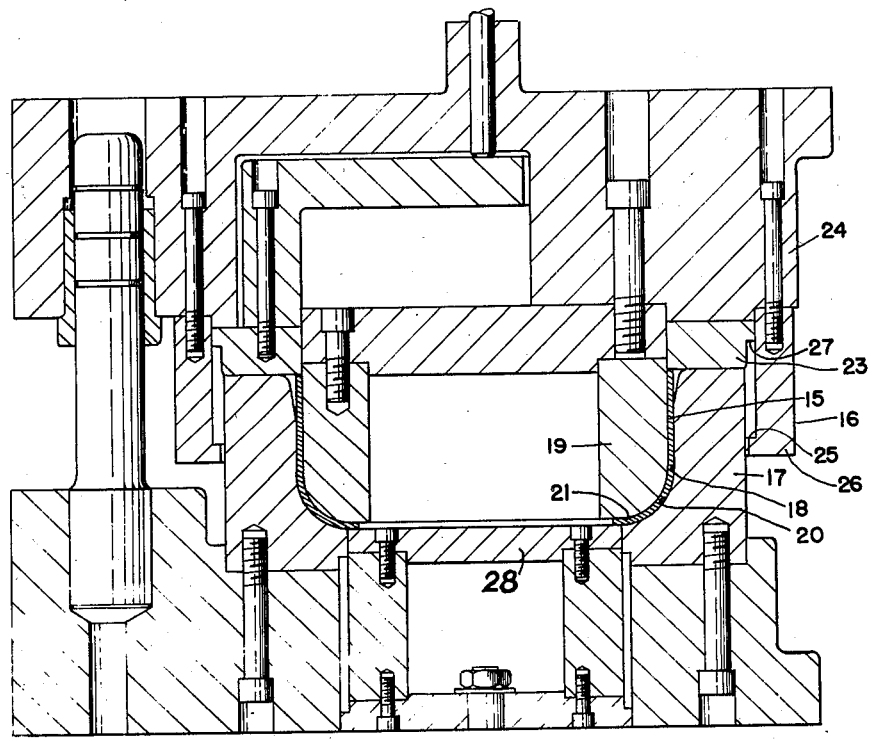
FIG. 4.
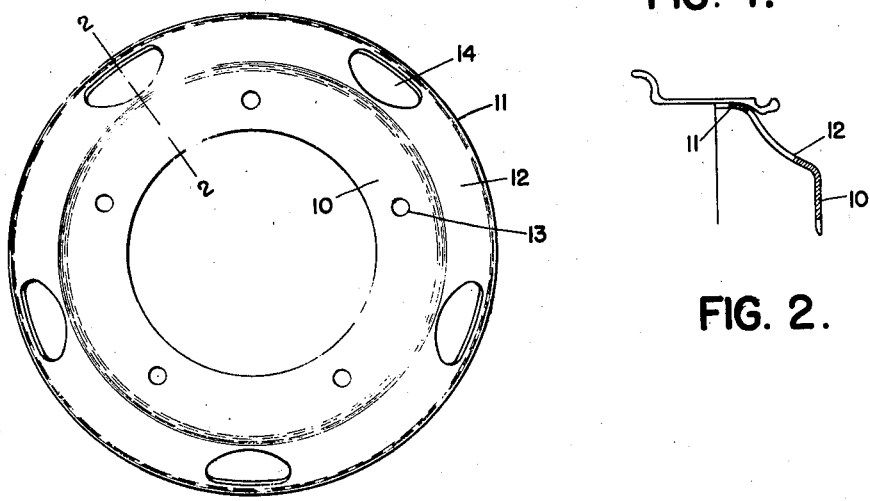
FIG. 2.
FIG. 1.
INVENTOR
FRANK. H. LeJEUNE.
BY
ATTORNEYS Aug. 22, 1939.  F. H LE JEUNE  2,170,661
METHOD OF MANUFACTURING WHEEL BODY ELEMENTS
Filed Feb. 23, 1937  3 Sheets-Sheet 2

INVENTOR
FRANK. H. LeJEUNE
BY
ATTORNEYS

Aug. 22, 1939.   F. H. LE JEUNE   2,170,661
METHOD OF MANUFACTURING WHEEL BODY ELEMENTS
Filed Feb. 23, 1937   3 Sheets-Sheet 3

INVENTOR
FRANK. H. LeJEUNE.

Patented Aug. 22, 1939

2,170,661

UNITED STATES PATENT OFFICE 2,170,661

METHOD OF MANUFACTURING WHEEL BODY ELEMENTS

Frank H. Le Jeune, Detroit, Mich., assignor to Kelsey-Hayes Wheel Company, Detroit, Mich., a corporation of Delaware Application February 23, 1937, Serial No. 127,277

6 Claims. (Cl. 29—159.01)

This invention relates generally to wheel bodies of the disc type and refers more particularly to a method of forming pressed-steel wheel bodies.

One of the principal objects of this invention consists in improving generally the manufacture of disc wheel body elements by providing a method composed of a relatively few simple pressing operations, capable of being expediently and inexpensively effected. In accordance with this invention, a disc wheel body element having a radially extending bolting-on flange and having an axially extending rim engaging flange connected to the bolting-on flange by an outwardly extending concave portion is formed from a tubular blank of substantial length by a relatively few pressing operations, without overstressing or appreciably thinning out the metal. The manner in which the foregoing is accomplished will be made more apparent as this description proceeds, especially when considered in connection with the accompanying drawings, wherein—

Figure 1 is a plan view of a metal disc wheel body member constructed in accordance with this invention;

Figure 2 is a cross sectional view taken substantially on the plane indicated by the line 2—2 of Figure 1;

Figure 4 is a sectional view through a portion of a press showing one step in the method of manufacture;

Figure 7:
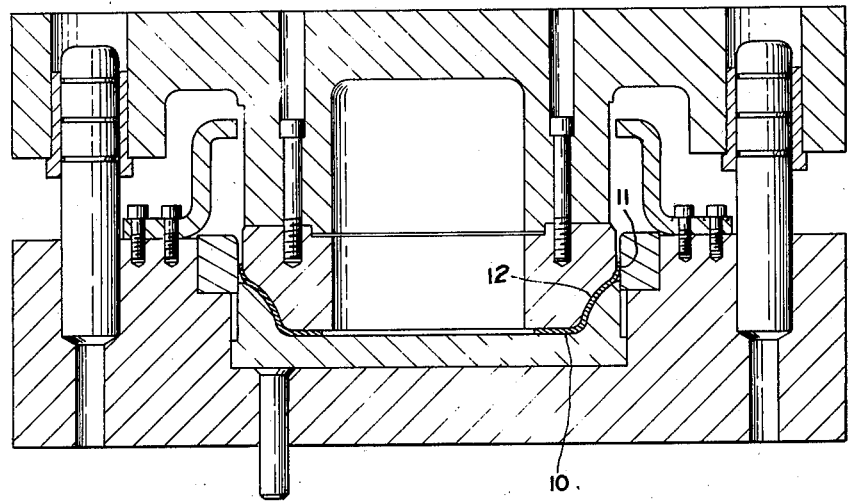
Figures 6 and 7 are sectional views illustrating the final pressing operation.

For the purpose of illustrating my improved method of manufacture, I have selected a pressed disc wheel body member of the type shown in Figures 1 and 2, although it will be understood from the following description that the method of manufacture is by no means limited to the particular design of wheel body illustrated in the above figures. It will be noted from Figures 1 and 2 that the pressed disc wheel body member selected for the purpose of illustrating the method of manufacture forming the subject matter of this invention, comprises a flat radially extending bolting-on flange 10 and an axially extending rim engaging flange 11 connected to the bolting-on flange 10 by means of a reverse curved, or concave portion 12. In accordance with conventional practice, the radially extending bolting-on flange 10 is formed with a plurality of circumferentially spaced openings 13 therethrough for receiving the fastening elements, and the concave connecting portion 12 is apertured at circumferentially spaced points in the manner designated by the reference character 14.

In accordance with the present invention, a wheel body of the general type described above may be expediently and inexpensively manufactured from a tubular blank of the requisite length by a relatively few pressing operations, without wrinkling or over-stressing any portion of the metal. The first step in this method consists in forming a tubular blank 15 of predetermined contour from a flat strip of stock of the required dimension. This tubular blank is then inserted in the press 16 shown in Figure 4, and the lower end of the blank is upset by bending the same inwardly on a continuous curve. It will be observed from the construction of the press that during the bending operation, the cylindrical side wall of the blank is supported in such a manner as to prevent buckling.

The foregoing will be perhaps more readily apparent upon considering the construction of the press employed to effect the bending operation. The press is fragmentarily shown in Figure 4 as provided with an annular fixed die 17 having an internal cylindrical surface 18 at the upper end thereof cooperating with the vertically reciprocable punch 19 to prevent buckling of the side walls of the blank during the bending operation and terminating at the lower end in an inwardly extending continuously curved surface 20. The surface 20 serves to bend the lower end of the blank in an inward direction as the blank is moved downwardly and the correspondingly curved surface 21 on the lower end of the punch 19 serves to press the metal against the surface 20.

The blank 15 is initially moved downwardly into the die by a yielding pressure acting on the ring 23, and is subsequently positively moved in a downward direction relative to the die 17 by reason of engagement of the ram 24 with the top of the ring 23. The punch 19 is shown as secured to the ram 24 for movement therewith as a unit, and the arrangement is such as to permit the punch to assume its lowermost position during the final bending operation. Any suitable means may be employed to exert the required initial yielding pressure on the ring 23 and this means, as well as the entire construction of the press, may be identical to the press shown in my copending application Serial No. 125866, filed February ruary 15, 1937. This latter application contains a complete description of the construction of the press 16 and the manner in which the same operates to bend the lower end of the blank 15 inwardly on the continuous curve 20, and the present description will not be complicated by a detailed definition of this apparatus. It may be briefly pointed out, however, that the ring 23 is maintained in its lowermost position shown in Figure 4 during initial upward movement of the ram 24 so as to strip the blank from the punch 19, and that upon completion of this stripping operation, the ring 23 is moved with the ram by reason of the engagement of the annular shoulder 25 on the ring 26 with a peripheral shoulder 27 on the ring 23. It will also be apparent from the description of the press noted in the above identified application that the bottom of the die 17 is formed by a reciprocable pad 28 movable upwardly in timed relation to the upward movement of the ram to eject the blank from the die 17.

Figure 5:
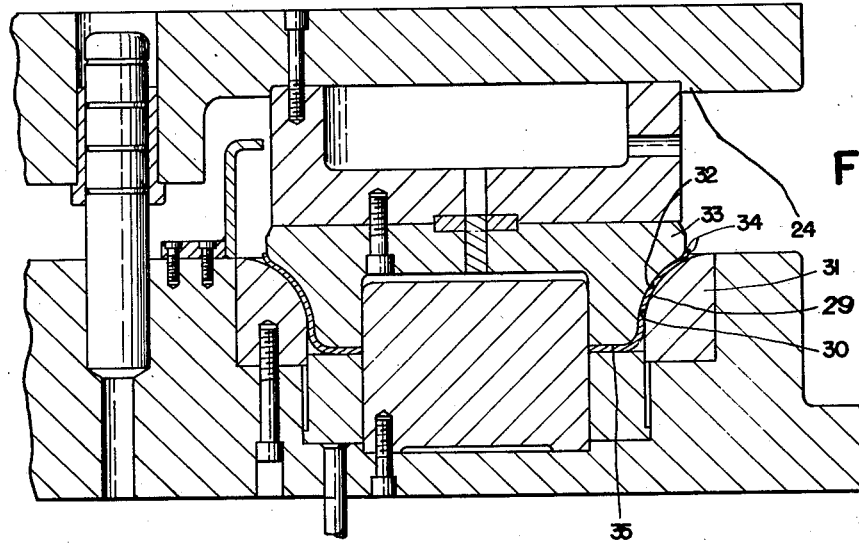
Figure 5 is a similar view showing another step in the method of manufacture.

Upon reference to Figure 5, it will be noted that the next step in the method consists in shaping the cylindrical side wall of the blank shown in Figure 4 to impart a reverse or "ogee" curve 29 to the side wall. In detail, the side wall of the blank is expanded outwardly against the continuous outwardly curved inner surface 30 of the annular fixed die member 31 by a correspondingly curved surface 32 of the reciprocable punch 33 so that upon completion of this operation, the annular side wall of the blank is concaved axially thereof. During this step of the method, the peripheral portion 34 of the blank is formed approximately to the diameter of the rim engaging flange 11 of the finished wheel body and the radius of the continuously curved lower end of the blank shown in Figure 4 is reduced to provide the blank with the radially inwardly extending portion 35.

Figure 6:
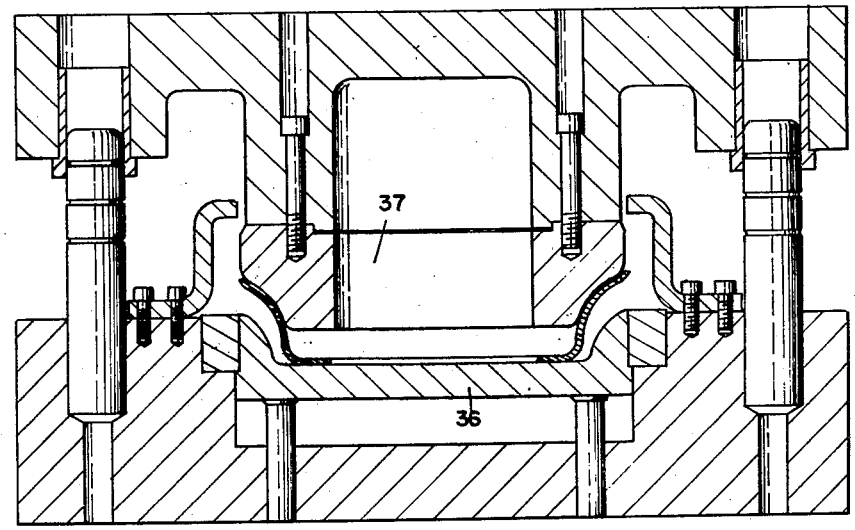

The blank resulting from the above step in the method is introduced between the cooperating dies 36 and 37 in the manner shown in Figure 6 of the drawings, and these dies cooperate with each other to form the blank to the finished contour of the wheel body disc. It will be observed from Figure 7 that relative movement of the two cooperating dies together expands the portion 29 of the blank shown in Figure 5 to substantially increase the radius of the concave portion of the blank and to form the same to the cross sectional contour of the portion 13 of the finished wheel body. At the same time the portion 13 is formed to the desired contour, the peripheral portion of the blank is extended to form the axially extending rim engaging portion 11, and the radius connecting the radially extending portion 35 of the blank to the side walls in Figure 5 is reduced to lengthen the portion 35 to the extent required to form the bolting-on flange 10. Attention is also called to the fact that the cooperating dies 36 and 37 not only extend the peripheral portion 34 of the blank in Figure 5 axially but, in addition, function to extend this flange on substantially the desired diameter of the rim engaging portion 11 of the wheel body.

It was pointed out above in connection with Figure 5 that the peripheral portion 34 of the blank is formed to the approximate diameter of the axially extending rim engaging seat 11 of the wheel body prior to being introduced to the final forming operation disclosed in Figures 6 and 7. In other words, the change of contour of the portion 29 of the blank shown in Figure 5 to the shape of the portion 12 shown in Figure 7 is effected without appreciably expanding the peripheral edge of the blank and, as a consequence, there is no tendency for this edge to split even though the intermediate portion of the blank is worked substantially during the final operation.

Upon completion of the final pressing operation shown in Figure 7, the radially extending bolting-on flange is apertured to provide the bolt openings 13 and the portion 12 of the disc is apertured at circumferentially spaced points to form the openings 14. Also, the central opening through the disc is trimmed to size and any other incidental operations are effected to form the finished wheel body disc illustrated in Figures 1 and 2. These latter operations may be effected in accordance with standard practice and, accordingly, the conventional fixtures for accomplishing the same are not shown herein.

Figure 3:
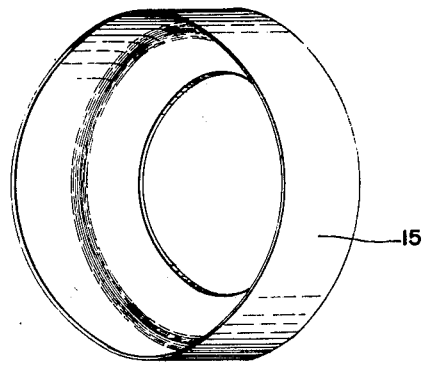
Figure 3 is a perspective view of a cup-shaped blank of the dimension required to form the disc wheel body shown in Figure 1.

Thus, from the foregoing, it will be observed that I have provided a method of forming a wheel body disc composed essentially of a relatively few pressing operations capable of being expediently and economically effected. It will also be apparent that my improved method renders it possible to draw the cup-shaped blank shown in Figure 3 to a substantial depth without the danger of overstressing, or wrinkling, any portion of the metal.

What I claim as my invention is—

1. In the method of forming a pressed metal wheel body having an axially extending rim engaging flange of predetermined diameter, those steps which consist in bending one end of a tubular blank inwardly, expanding the opposite end portion of the tubular blank to form the radially outer edge thereof to the approximate diameter of the rim engaging flange on the wheel body, fashioning the side wall of the blank to a predetermined contour while maintaining the diameter aforesaid of the radially outer edge of the blank, and refashioning the side wall of the blank by expanding a part of the blank to the diameter of the radially outer edge aforesaid to form the axially extending rim engaging flange.

2. In the method of forming a pressed metal wheel body having an axially extending rim engaging flange of predetermined diameter, those steps which consist in bending one end of a tubular blank inwardly, expanding the opposite end portion of the blank to form the radially outer edge thereof to the approximate diameter of the rim engaging flange on the wheel body, simultaneously fashioning the side wall of the blank to form an annular concave portion, and refashioning the side wall of the blank by expanding a part of the concave portion to the diameter of the radially outer edge aforesaid to form the axially extending rim engaging flange of the wheel body.

3. In the method of forming a pressed metal wheel body having an axially extending rim engaging flange at the periphery thereof and having a radially inwardly extending bolting-on flange, those steps which consist in upsetting one end of a tubular blank to form an inwardly curved portion, expanding the opposite end portion of the blank to form the radially outer edge of the blank to the approximate diameter of the rim engaging flange, simultaneously fashioning the side wall of the blank to form an annular concave portion, refashioning the side wall of the blank by expanding a part of the concave portion to the diameter of the radially outer edge aforesaid to form the axially extending rim engaging flange of the wheel body, and simultaneously flattening another part of the concave portion to locate the same in the plane of the bolting-on flange.

4. In the method of forming a pressed metal wheel body having an axially extending rim engaging flange of predetermined diameter at the periphery thereof and having a radially inwardly extending bolting-on flange, those steps which consist in upsetting one end of a tubular blank to form an inwardly curved portion, expanding the cylindrical side wall of the blank to form the radially outer edge of the expanded portion to the approximate diameter of the rim engaging flange on the wheel body, simultaneously reducing the degree of curvature of the inwardly curved end of the blank by flattening a portion of said end in the plane of the bolting-on flange, and refashioning the side wall of the blank by expanding a part of said side wall to the diameter of the radially outer edge aforesaid to form the axially extending rim engaging flange.

5. In the method of forming a pressed metal wheel body having an axially extending rim engaging flange of predetermined diameter at the periphery thereof and having a radially inwardly extending bolting-on flange, those steps which consist in upsetting one end of a tubular blank to form an inwardly curved portion, expanding the cylindrical side wall of the blank to form the radially outer edge of the expanded portion to the approximate diameter of the rim engaging flange on the wheel body, simultaneously reducing the degree of curvature of the inwardly curved end of the blank by flattening a portion of said end in the plane of the bolting-on flange, refashioning the side wall of the blank by expanding a part of said side wall to the diameter of the radially outer edge aforesaid to form the axially extending rim engaging flange, and simultaneously flattening another portion of the expanded portion of the blank in the plane of the bolting-on flange.

6. In the method of forming a pressed metal wheel body having an axially extending rim engaging flange of predetermined diameter at the periphery thereof and having a radially inwardly extending bolting-on flange, those steps which consist in upsetting one end of a tubular blank to form an inwardly curved portion, expanding the cylindrical side wall of the blank to form the radially outer edge of the expanded portion to the approximate diameter of the rim engaging flange, fashioning the side wall of the blank during the expanding operation to form an annular concave portion, simultaneously reducing the degree of curvature of the inwardly curved end of the blank by flattening a part of this curved portion in the plane of the bolting-on flange, further fashioning the concave side wall portion of the blank by expanding a part of the concave portion to the diameter of the radially outer edge aforesaid to provide the axially extending rim engaging flange of the wheel body, and flattening another part of the concave portion during the refashioning operation in the plane of the bolting-on flange.

FRANK H. LE JEUNE.